United States Patent
Narita

(10) Patent No.: US 9,277,128 B2
(45) Date of Patent: Mar. 1, 2016

(54) IMAGE PROCESSING APPARATUS, IMAGE CAPTURE APPARATUS WITH THE SAME, AND METHOD FOR CONTROLLING IMAGE PROCESSING APPARATUS TO AVOID PARTIAL LOSS OF AN OUTPUT IMAGE BY APPLYING GEOMETRIC DEFORMATION TO AN IMAGE

(71) Applicant: CANON KABUSHIKI KAISHA, Tokyo (JP)

(72) Inventor: Yu Narita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 14/132,337

(22) Filed: Dec. 18, 2013

(65) Prior Publication Data

US 2014/0176755 A1    Jun. 26, 2014

(30) Foreign Application Priority Data

Dec. 25, 2012    (JP) .................................. 2012-281750

(51) Int. Cl.
*H04N 5/232*    (2006.01)
*G06T 5/00*    (2006.01)

(52) U.S. Cl.
CPC ............ *H04N 5/23251* (2013.01); *G06T 5/006* (2013.01); *H04N 5/23258* (2013.01); *H04N 5/23267* (2013.01)

(58) Field of Classification Search
USPC ........................................................ 348/208.6
See application file for complete search history.

(56) References Cited

U.S. PATENT DOCUMENTS

| | | | | |
|---|---|---|---|---|
| 2006/0197843 A1* | 9/2006 | Yoshimatsu | ................ | 348/219.1 |
| 2010/0295956 A1* | 11/2010 | Goto | ........................... | 348/208.6 |
| 2011/0149096 A1* | 6/2011 | Matsuyama | ................ | 348/208.6 |
| 2012/0033100 A1* | 2/2012 | Harikae et al. | ............. | 348/223.1 |
| 2013/0329063 A1* | 12/2013 | Zhou | ........................... | 348/208.6 |
| 2014/0078327 A1* | 3/2014 | Miyasako | ................... | 348/208.6 |
| 2014/0111661 A1* | 4/2014 | Watanabe et al. | .......... | 348/208.6 |
| 2014/0184837 A1* | 7/2014 | Shibata | ...................... | 348/208.6 |
| 2014/0307111 A1* | 10/2014 | Nishigori | ................... | 348/208.4 |
| 2015/0022678 A1* | 1/2015 | Tsubaki | ..................... | 348/208.5 |

FOREIGN PATENT DOCUMENTS

JP    2010-273245 A    12/2010

* cited by examiner

*Primary Examiner* — Shahbaz Nazrul

(74) *Attorney, Agent, or Firm* — Cowan, Liebowitz & Latman, P.C.

(57) ABSTRACT

Disclosed in an image processing apparatus capable of avoiding partial loss of an output image due to a lack of reference pixels, when generating an output image by applying geometric deformation to an image. The image processing apparatus determines whether a reference area required in a geometric deformation process fits within a captured area, and, in the case where the reference area required in the geometric deformation process does not fit within the captured area, sets an upper limit for a displacement amount of the reference area of the geometric deformation process so that the reference area fits, and applies the geometric deformation process, which uses a geometric deformation parameter generated based on the set upper limit, to the image.

7 Claims, 10 Drawing Sheets

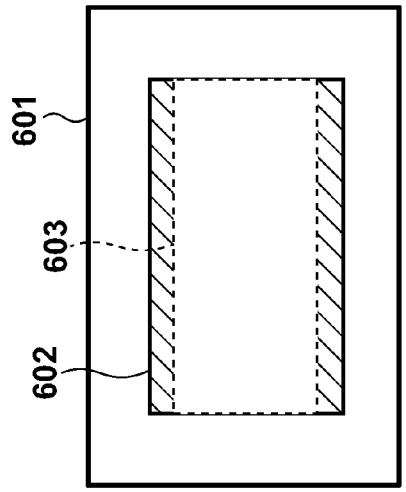 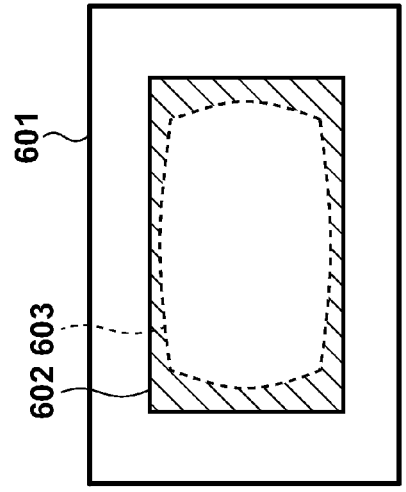 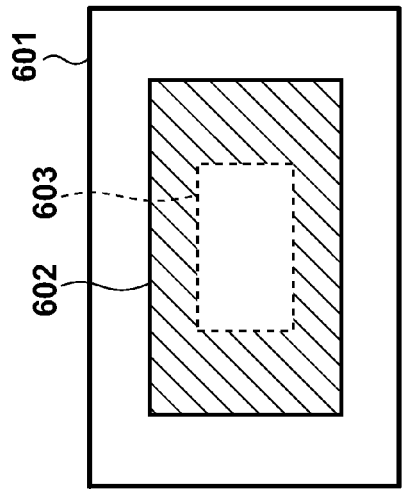
FIG. 6A  FIG. 6B  FIG. 6C
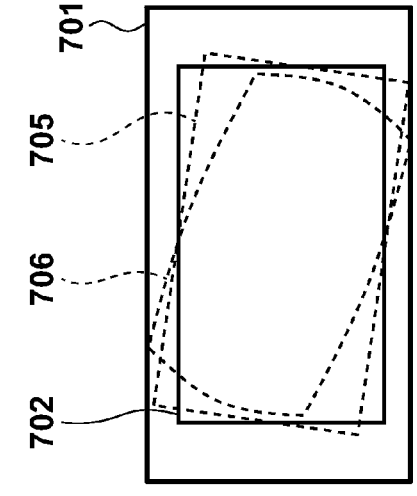 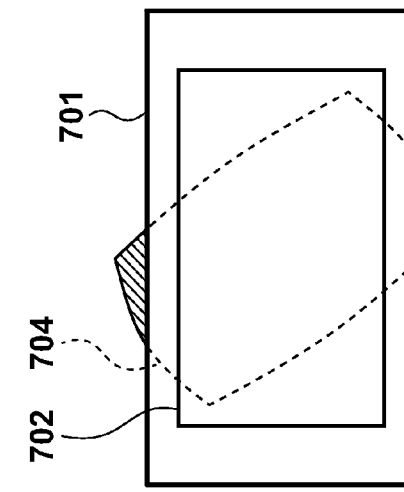 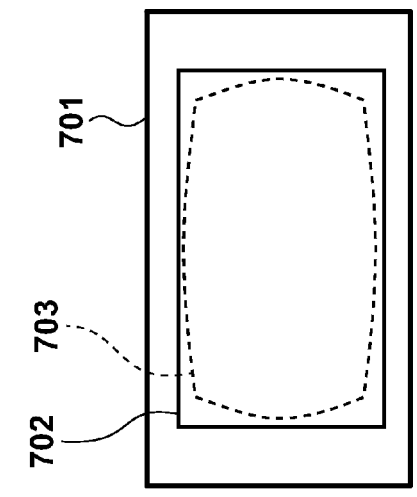
FIG. 7A  FIG. 7B  FIG. 7C

FIG. 9A

| PRIORITY LEVEL \ LIKELIHOOD OF BEING HUMAN | LOW | HIGH |
|---|---|---|
| 1 | ROTATION | ROLLING SHUTTER DISTORTION |
| 2 | ROLLING SHUTTER DISTORTION | DISTORTION ABERRATION |
| 3 | DISTORTION ABERRATION | TILT |
| 4 | TILT | ROTATION |

FIG. 9B

| PRIORITY LEVEL \ SIZE OF SUBJECT | SMALL | LARGE |
|---|---|---|
| 1 | ROTATION | ROLLING SHUTTER DISTORTION |
| 2 | ROLLING SHUTTER DISTORTION | DISTORTION ABERRATION |
| 3 | DISTORTION ABERRATION | TILT |
| 4 | TILT | ROTATION |

FIG. 9C

| PRIORITY LEVEL \ DISTANCE TO SUBJECT | CLOSE | FAR |
|---|---|---|
| 1 | ROLLING SHUTTER DISTORTION | ROTATION |
| 2 | DISTORTION ABERRATION | ROLLING SHUTTER DISTORTION |
| 3 | TILT | DISTORTION ABERRATION |
| 4 | ROTATION | TILT |

| BRIGHTNESS VALUE / PRIORITY LEVEL | LOW | HIGH |
|---|---|---|
| 1 | ROTATION | ROLLING SHUTTER DISTORTION |
| 2 | ROLLING SHUTTER DISTORTION | DISTORTION ABERRATION |
| 3 | DISTORTION ABERRATION | TILT |
| 4 | TILT | ROTATION |

| SHUTTER SPEED / PRIORITY LEVEL | SLOW | FAST |
|---|---|---|
| 1 | ROTATION | ROLLING SHUTTER DISTORTION |
| 2 | ROLLING SHUTTER DISTORTION | DISTORTION ABERRATION |
| 3 | DISTORTION ABERRATION | TILT |
| 4 | TILT | ROTATION |

IMAGE PROCESSING APPARATUS, IMAGE CAPTURE APPARATUS WITH THE SAME, AND METHOD FOR CONTROLLING IMAGE PROCESSING APPARATUS TO AVOID PARTIAL LOSS OF AN OUTPUT IMAGE BY APPLYING GEOMETRIC DEFORMATION TO AN IMAGE

BACKGROUND OF THE INVENTION

1. Field of the Invention

The present invention relates to an image processing apparatus, an image capture apparatus provided with the same, and a method for controlling the image processing apparatus, and more particularly to technology for correcting image quality degradation.

2. Description of the Related Art

In recent years, images captured by image capture apparatuses such as digital cameras have become more likely to suffer image quality degradation caused by the optical characteristics of the lens and camera shake, following the advent of more compact devices, wider angle lenses, and sensors with higher pixel counts. Distortion aberration is an example of image quality degradation due to the optical characteristics of the lens. On the other hand, camera shake causes unintended rotational and translational motion of the camera by the photographer, and thus produces image quality degradation such as translational movement, rotation and tilt in captured images. Also, image sensors employing a rolling shutter such as CMOS sensors, in which the exposure timing differs every line, causes a phenomenon known as rolling shutter distortion whereby a captured image is distorted due to camera shake and motion of the subject.

In order to correct such image quality degradation, technology that applies a plurality of geometric deformation processes to captured images has been proposed, with Japanese Patent Laid-Open No. 2010-273245 disclosing a method of correcting image quality degradation due to distortion aberration and camera shake by geometric deformation processes.

Here, processes for geometrically deforming an image will be described using FIG. 10A.

An output image area 1002 is provided within a captured area 1001. Also, it is assumed that while the photographer tried to capture a subject 1004 that is standing vertically upright in the middle of the output image area, camera shake caused the image capture apparatus to rotate parallel to an image capture plane, and the subject ended up being captured like a subject 1005.

In this case, by replacing the pixel of the coordinates (Xn, Yn) of the output image area with the pixel of the coordinates (Xn', Yn') of an area 1003 shown by a dotted line, the subject 1005 is deformed to be like the subject 1004 (image quality degradation due to camera shake is corrected).

Processing that involves replacing the pixels of given coordinates within an image with reference to the pixels of other coordinates in this way is called geometric deformation of an image. The pixels that are referenced at this time are called reference pixels, and the area that is formed by the reference pixels is called a reference area. In FIG. 10A, (Xn', Yn') is a reference pixel, and the area 1003 shown by the dotted line is a reference area.

However, in the case where geometric deformation is performed using a reference area that sticks out from the captured area, pixels that should be referenced in the area of the reference area that sticks out from the captured area do not exist, resulting in the loss of a portion of the image after geometric deformation.

This problem will be described using FIG. 10B. In comparison with FIG. 10A, the size of an output image area 1007 is the same but a captured area 1006 is smaller. Here, to correct similar camera shake to the case of FIG. 10A by geometric deformation, the pixels of a reference area 1008 need to be referenced. However, hatched portions 1011 of the reference area 1008 stick out from the captured area 1006, and pixels that should be referenced do not exist.

Accordingly, when an output image is generated using the reference area 1008 as is, an area equivalent to the portions indicated by reference numeral 1011 will be lost.

This also applies to Japanese Patent Laid-Open No. 2010-273245. While it is conceivable to change the reference area in order to avoid partial loss of an image that has undergone geometric deformation, the way in which the reference area should be changed is not easy to determine in cases such as Japanese Patent Laid-Open No. 2010-273245 which performs a plurality of geometric deformation processes.

SUMMARY OF THE INVENTION

The present invention has been made in view of such problems with conventional technology, and provides an image processing apparatus capable of avoiding partial loss of an output image due to a lack of reference pixels when generating an output image by applying a deformation process to an image, and a control method for the same.

According to one aspect of the present invention, there is provided an image processing apparatus for correcting image quality degradation, comprising: a generating unit that generates a parameter defining a deformation process for correcting the image quality degradation; a determining unit that determines whether a reference area, which is an image area required by the deformation process, fits within a captured area that contains the image and is larger than the image; an adjusting unit that adjusts the parameter such that the reference area fits within the captured area, in a case where it is determined by the determining unit that the reference area does not fit within the captured area; and a deforming unit that applies the deformation process to the image in accordance with the parameter.

According to another aspect of the present invention, there is provided an image capture apparatus comprising: a detection unit that detects motion of the image capture apparatus; and the image processing apparatus according to the present invention, wherein the image processing apparatus corrects image quality degradation that has occurred in an image due to motion of the image capture apparatus and outputs the corrected image.

According to still another aspect of the present invention, there is provided a method for controlling an image processing apparatus that corrects image quality degradation, comprising: a generating step of generating a parameter defining a deformation process for correcting the image quality degradation; a determining step of determining whether a reference area, which is an image area required by the deformation process, fits within a captured area that contains the image and is larger than the image; an adjusting step of adjusting the parameter such that the reference area fits within the captured area, in a case where it is determined in the determining step that the reference area does not fit within the captured area; and a deforming step of applying the deformation process to the image in accordance with the parameter.

Further features of the present invention will become apparent from the following description of exemplary embodiments with reference to the attached drawings.

BRIEF DESCRIPTION OF THE DRAWINGS

FIGS. 6A to 6C are diagrams for describing cases where a displacement amount of a reference area is negative, in an embodiment of the present invention.

FIGS. 7A to 7C are diagrams for describing a problem that can occur as a result of setting an upper limit for a negative displacement amount.

FIGS. 9A to 9F are diagrams for describing a method of setting priorities according to the second embodiment of the present invention.

DESCRIPTION OF THE EMBODIMENTS

Exemplary embodiments of the present invention will now be described in detail in accordance with the accompanying drawings.

First Embodiment

Figure 1:
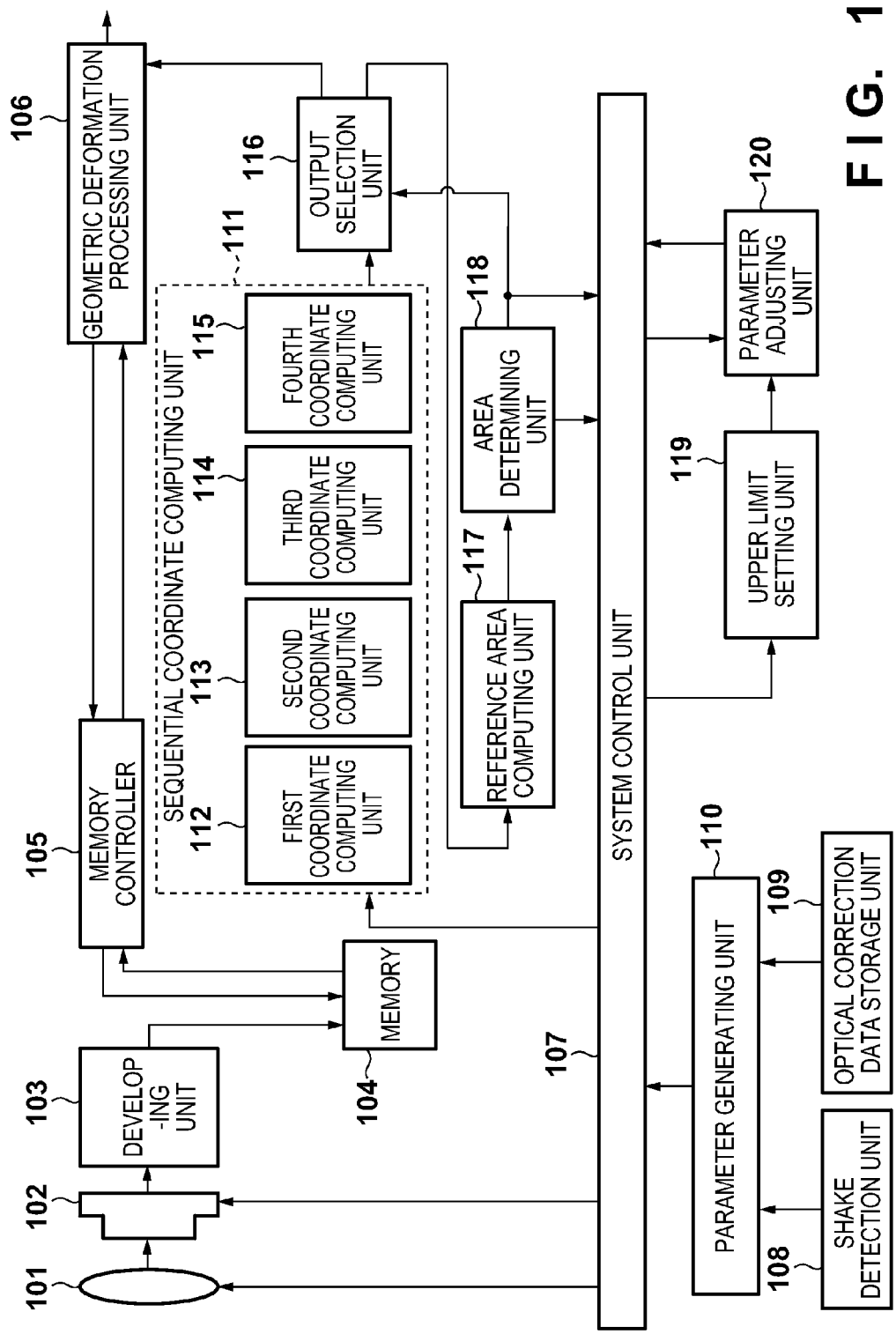
FIG. 1 is a block diagram showing an exemplary functional configuration of a digital camera serving as an example of an image processing apparatus according to a first embodiment of the present invention.

FIG. 1 is a block diagram showing an exemplary functional configuration of a digital camera serving as an example of an image processing apparatus according to a first embodiment of the present invention. Note that, in implementing a deformation process, any configuration that enables information relating to motion of an image capture apparatus, information relating to shooting conditions, a captured area, a reference area, and information indicating the type of deformation process to apply to be acquired is applicable, and that at least mechanisms for image capture and recording are not essential.

Also, the present embodiment is premised on a configuration that corrects image quality degradation of a captured image caused by optical characteristics and/or motion of the image capture apparatus, by applying a deformation process to the captured image. Thus, an image corresponding to an output area is generated, using an image corresponding to a captured area that contains the output area and is larger than the output area (i.e., the captured area is an area that results from providing a margin around the output area).

An optical image formed on an image sensor 102 via an optical system 101 is converted into image signals by the image sensor 102. The image signals are subjected to A/D conversion, white balance adjustment, color (luminance/color difference signal) conversion, γ correction or the like by a developing unit 103, and stored in a memory 104.

The image signals stored in the memory 104 are read out in accordance with addresses that are input from a memory controller 105, and input to a geometric deformation processing unit 106 via the memory controller 105. The memory controller 105 provides the memory 104 with addresses such that the image signals are read out from the pixel on the left edge to the pixel on the right edge, sequentially from the uppermost line of the image area being read out, for example.

A system control unit 107 controls the operations of the entire digital camera. The system control unit 107 controls the focal length, aperture value and focus distance of the optical system 101 and the drive system of the image sensor 102.

A shake detection unit 108 that detects information relating to the motion of the digital camera is an angular velocity sensor, for example, and functions to detect the angular velocities about 3 axes (yaw, roll, pitch) that are produced by the motion of the digital camera, and outputs the detected angular velocities to a parameter generating unit 110 as motion information.

An optical correction data storage unit 109 has prestored therein optical correction data for correcting distortion aberration that occurs in captured images due to the optical characteristics of the optical system 101. For example, optical correction data is stored in association with combinations of parameters of the optical system 101, such as aperture value and focal length.

The parameter generating unit 110 generates geometric deformation parameters for correcting the influence that camera shake and the optical characteristics of the lens exerts on captured images, from the motion information on the digital camera that is obtained from the shake detection unit 108 and the optical correction data that is obtained from the optical correction data storage unit 109. A geometric deformation parameter is a parameter that defines a geometric deformation process. The parameter generating unit 110 generates a parameter for every type of geometric deformation process, such that correction can be realized by combining a plurality of geometric deformation processes that the sequential coordinate computing unit 111 is capable of executing.

Figure 2:
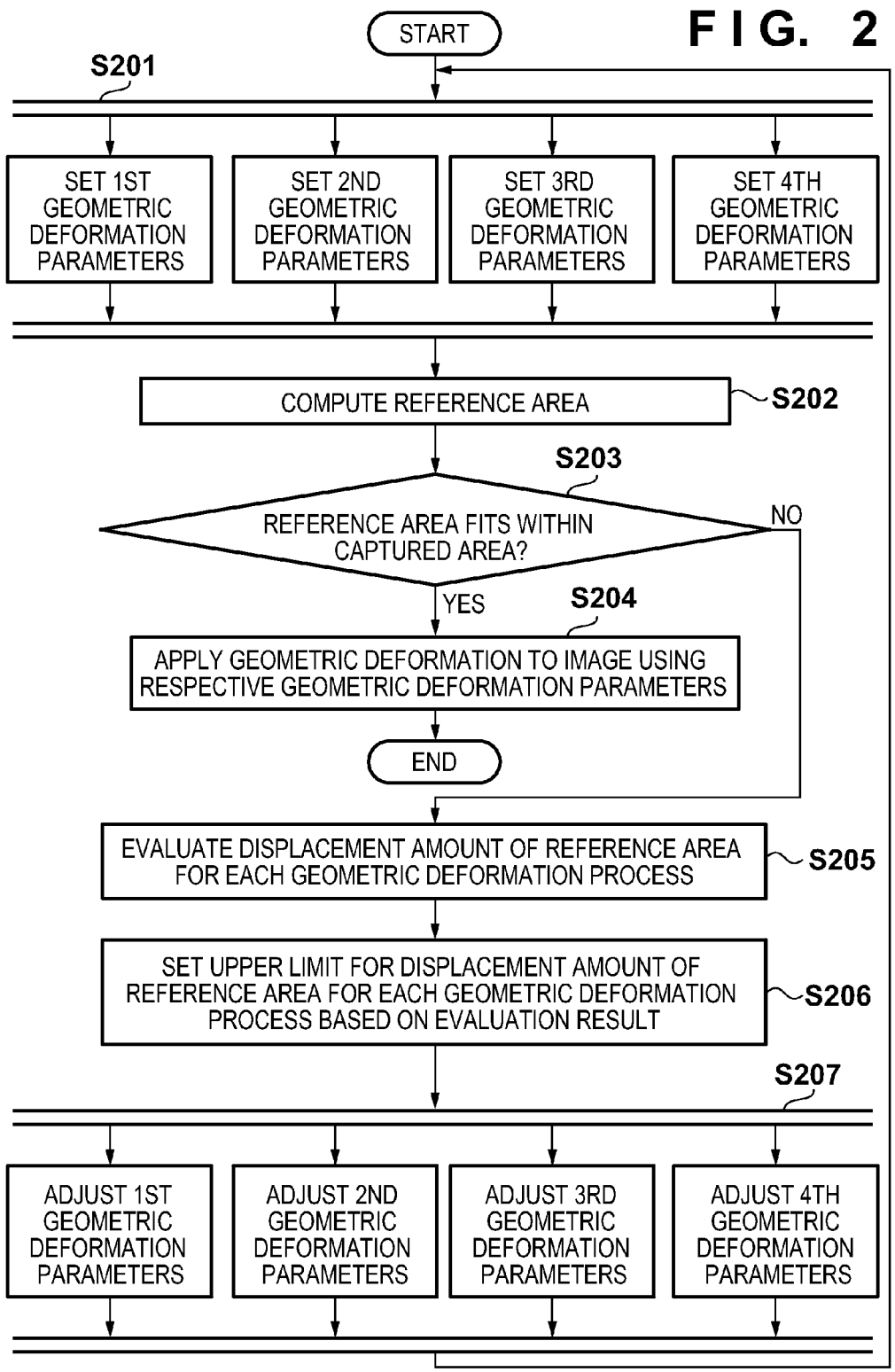
FIG. 2 is a flowchart for describing geometric deformation processes according to the first embodiment of the present invention.

The main flow of geometric deformation will be described using the flowchart of FIG. 2.

In S201, the system control unit 107 inputs geometric deformation parameters to the sequential coordinate computing unit 111. The sequential coordinate computing unit 111 is constituted by a first coordinate computing unit 112, a second coordinate computing unit 113, a third coordinate computing unit 114, and a fourth coordinate computing unit 115.

In S202, a reference area computing unit 117 computes a reference area required for geometrically deforming the image, using the output of the sequential coordinate computing unit 111 that is obtained via an output selection unit 116.

In S203, an area determining unit 118 determines whether the reference area computed in S202 fits within the captured area.

If it determines that the reference area fits within the captured area, the geometric deformation processing unit 106, in S204, performs geometric deformation on the image, based on the output of the sequential coordinate computing unit 111 that is obtained via the output selection unit 116.

On the other hand, if it is determined that the reference area does not fit within the captured area, an upper limit setting unit 119, in S205, evaluates the size of the reference area for each of a plurality of geometric deformations, from the output of the area determining unit 118.

In S206, the upper limit setting unit 119 sets an upper limit for the reference area of each geometric deformation, based on the evaluation result of S205.

In S207, a parameter adjusting unit 120 adjusts each geometric deformation parameter that is input from the system control unit 107, such that the reference area of each geometric deformation does not exceed the upper limit set in S206.

Hereinafter, the processing from S201 is performed again.

Next, the details of the sequential coordinate computing unit 111 and the related geometric deformation parameters will be described.

In the present embodiment, the processes for geometrically deforming an image are assumed to be resizing and clipping, projective transform, rolling shutter distortion correction, and distortion aberration correction. Rolling shutter distortion is distortion that occurs with image capture performed using an image sensor employing a rolling shutter system, as described above.

Internal Configuration of Sequential Coordinate Computing Unit 111

Figure 3:
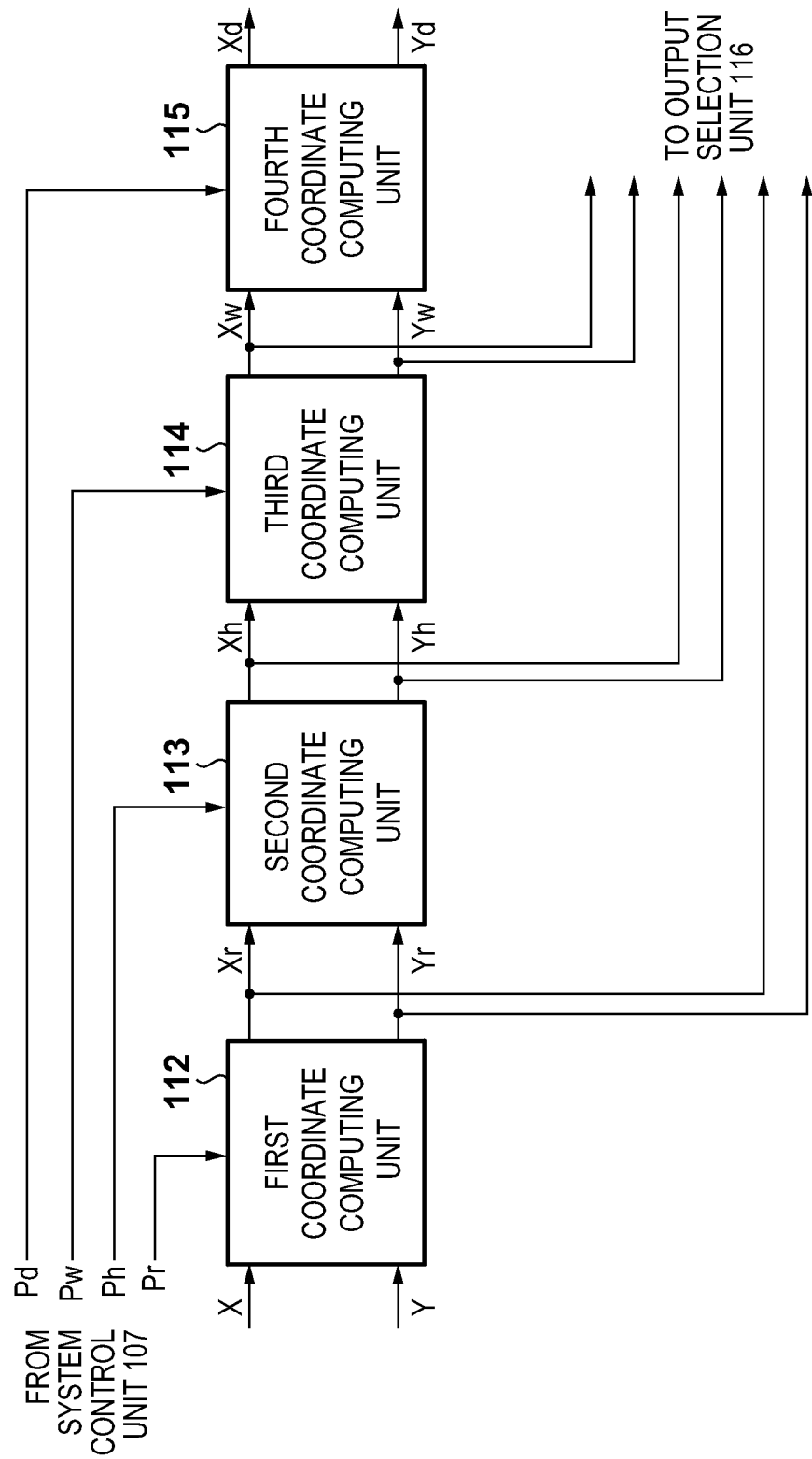
FIG. 3 is a block diagram showing an exemplary configuration of a sequential coordinate computing unit in an embodiment of the present invention.

The internal configuration of the sequential coordinate computing unit 111 and the processing performed in the sequential coordinate computing unit 111 will be described using FIG. 3.

The first coordinate computing unit 112 computes reference coordinates for performing resizing and clipping of an image, and outputs the computed reference coordinates to the second coordinate computing unit 113 and the output selection unit 116.

The geometric deformation parameter that is used by the first coordinate computing unit 112 is expressed as a first geometric deformation parameter Pr. The first geometric deformation parameter Pr includes a horizontal magnification rx and a vertical magnification ry for use in resizing, and a horizontal clipping amount c and a vertical clipping amount d for use in clipping.

In this case, the reference coordinates (Xr, Yr) for use in resizing and clipping are computed by the following equation with respect to the coordinates (X, Y), where (Xr0, Yr0) are the central coordinates of the resizing.

$$\begin{bmatrix} Xr \\ Yr \end{bmatrix} = \begin{bmatrix} 1/rx & 0 \\ 0 & 1/ry \end{bmatrix} \begin{bmatrix} X - Xr0 \\ Y - Yr0 \end{bmatrix} + \begin{bmatrix} c \\ d \end{bmatrix} + \begin{bmatrix} Xr0 \\ Yr0 \end{bmatrix} \quad \text{(Eq. 1)}$$

For example, in the case of resizing to enlarge an image two-fold horizontally and vertically, the first geometric parameter Pr is set such that rx=ry=2 and c=d=0 (since clipping will not be performed). If (Xr0, Yr0)=(0, 0), then Xr=½X and Yr=½Y, and resizing is realized by replacing the pixel of coordinates (X, Y) with the pixel of coordinates (½X, ½Y).

The second coordinate computing unit 113 computes reference coordinates for performing the projective transform on an image, based on the output of the first coordinate computing unit 112, and outputs the computed reference coordinates to the third coordinate computing unit 114 and the output selection unit 116. The projective transform can be used in order to correct rotation, tilt and the like of an image that occur due to camera shake.

The geometric deformation parameter used by the second coordinate computing unit 113 is expressed as a second geometric deformation parameter Ph. The second geometric deformation parameter Ph is given by a 3×3 projective transform matrix, for example. The amount of translational movement in the X direction is given as tx, the amount of translational movement in the Y direction is given as ty, the rotation angle is given as θ, the amount of tilt in the X direction is given as vx, and the amount of tilt in the Y direction is given as vy. In this case, a projective transform matrix H1 for correcting translational movement and rotation of an image and a projective transform matrix H2 for correcting tilt of an image are respectively expressed as follows:

$$H1 = \begin{bmatrix} \cos\theta & -\sin\theta & tx \\ \sin\theta & \cos\theta & ty \\ 0 & 0 & 1 \end{bmatrix} \quad \text{(Eq. 2)}$$

$$H2 = \begin{bmatrix} 1 & 0 & 0 \\ 0 & 1 & 0 \\ vx & vy & 1 \end{bmatrix} \quad \text{(Eq. 3)}$$

The projective transform matrix Ph for correcting translation, rotation, and tilt of an image is given as follows by the multiplication of H1 and H2.

$$Ph = H1H2 = \begin{bmatrix} \cos\theta + tx\cdot vx & -\sin\theta + tx\cdot vy & tx \\ \sin\theta + ty\cdot vx & \cos\theta + ty\cdot vy & ty \\ vx & vy & 1 \end{bmatrix} \quad \text{(Eq. 4)}$$

Here, the translational movement amounts tx and ty, the rotation angle θ, and the tilt amounts vx and vy are represented by the following equation, where α, β and γ are respectively the deflection angle in the yaw direction, the pitch direction and the roll direction of the camera, and f is the focal length of the optical system.

$$tx = f(\tan\alpha \cos\gamma/\cos\beta + \tan\beta \sin\gamma) \; ty = f(-\tan\alpha \sin\gamma/\cos\beta + \tan\beta \cos\gamma) \; \theta = -\gamma vx = -\tan\alpha/f vy = -\tan\beta/(f\cos\alpha) \quad \text{(Eq. 5)}$$

Note that the shake angles α, β and γ are obtained by integrating the angular velocities of the shake that are obtained from the shake detection unit 108 with an integrator. The reference coordinates (Xh, Yh) for use in the projective transform are computed by the following equation with respect to the output coordinates (Xr, Yr) of the first coordinate computing unit 112, where (Xh0, Yh0) are the central coordinates of the projective transform.

$$\begin{bmatrix} Xh' \\ Yh' \\ m \end{bmatrix} = Ph \begin{bmatrix} Xr - Xh0 \\ Yr - Yh0 \\ 1 \end{bmatrix}, \quad \text{(Eq. 6)}$$

$$\begin{bmatrix} Xh \\ Yh \end{bmatrix} = \begin{bmatrix} Xh'/m \\ Yh'/m \end{bmatrix} + \begin{bmatrix} Xh0 \\ Yh0 \\ 0 \end{bmatrix}$$

The third coordinate computing unit 114 computes reference coordinates for correcting rolling shutter distortion of an image, based on the output of the second coordinate computing unit 113, and outputs the computed reference coordinates to the fourth coordinate computing unit 115 and the output selection unit 116.

Rolling shutter distortion is distortion of a captured image that occurs because of the subject image moving every line due to movement of the subject during exposure or camera shake caused by the photographer, in the case where image capture is performed with an image sensor in which exposure period differs every line such as a CMOS sensor.

The geometric deformation parameter that is used by the third coordinate computing unit 114 is expressed as a third geometric deformation parameter Pw. The third geometric deformation parameter Pw includes correction amounts y and p of rolling shutter distortion in the yaw direction and the pitch direction. The correction amount of rolling shutter distortion that occurs due to camera shake caused by the photographer can be computed by integrating the angular velocities of the shake that are obtained from the shake detection unit 108 with an integrator to convert the angular velocities into shake angles, and deriving the amount of displacement of the shake angles between lines.

When computing reference coordinates, the correction amounts y and p need to be converted to coordinate movement amounts y' and p'. This conversion can be performed by the following equation, where f is the focal length of the optical system 101, and c is the cell pitch (pixel pitch) of the image sensor 102.

$$y' = f\tan(y)/c, p' = f\tan(p)/c \qquad \text{(Eq. 7)}$$

The reference coordinates (Xw, Yw) used in rolling shutter distortion image shake correction are computed by the following equation with respect to the output coordinates (Xh, Yh) of the second coordinate computing unit 113.

$$\begin{bmatrix} Xw \\ Yw \end{bmatrix} = \begin{bmatrix} Xh \\ Yh \end{bmatrix} - \begin{bmatrix} y' \\ p' \end{bmatrix} \qquad \text{(Eq. 8)}$$

The fourth coordinate computing unit 115 is connected to the third coordinate computing unit 114, and functions to compute reference coordinates for performing distortion aberration correction of an image and output the computed reference coordinates to the output selection unit 116.

The geometric deformation parameter that is used by the fourth coordinate computing unit 115 is expressed as a fourth geometric deformation parameter Pd. The fourth geometric deformation parameter Pd is the distortion aberration correction amount.

Distortion aberration depends on the lens of the optical system 101, and produces concentric distortion about the optic axis of the lens. Accordingly, the distortion aberration correction amount takes a different value according to the distance (image height) from the optic axis. The distortion aberration correction amount Pd is given as follows by the ratio of a real image height rd to an ideal image height rn.

$$Pd = \frac{rd}{rn} \qquad \text{(Eq. 9)}$$

The reference coordinates (Xd, Yd) used in the distortion aberration correction are computed by the following equation with respect to the output coordinates (Xw, Yw) of the third coordinate computing unit 114, where (Xd0, Yd0) are the central coordinates of the distortion aberration correction.

$$\begin{bmatrix} Xd \\ Yd \end{bmatrix} = \begin{bmatrix} Pdx \\ Pdy \end{bmatrix} \begin{bmatrix} Xw - Xd0 \\ Yw - Yd0 \end{bmatrix} + \begin{bmatrix} Xd0 \\ Yd0 \end{bmatrix} \qquad \text{(Eq. 10)}$$

Here, Pdx and Pdy are respectively the horizontal component and the vertical component of Pd. The sequential coordinate computing unit 111 is as described above.

Next, the output selection unit 116 inputs the output of the sequential coordinate computing unit 111 to the geometric deformation processing unit 106, in the case where it is determined, from the determination result of the area determining unit 118, that the reference area fits within the captured area. Also, in the case where it is not determined that the reference area fits within the captured area, the output selection unit 116 inputs the output of the sequential coordinate computing unit 111 to the reference area computing unit 117.

The geometric deformation processing unit 106 applies geometric deformation to the image, based on the output of the sequential coordinate computing unit 111 that is input via the output selection unit 116.

Although the sequential coordinate computing unit 111 is capable of computing reference coordinates with decimal precision, the coordinates of the pixels of a digital image are all expressed in integers. Thus, the pixel value of coordinates that include a decimal point is computed by interpolating the pixel value from pixels of neighboring integer coordinates. This interpolation processing can be performed by applying a well-known technique such as bilinear interpolation that involves performing linear interpolation using the values of four pixels neighboring the pixel being interpolated, for example.

The geometric deformation processing unit 106 outputs neighboring pixel coordinates required in the interpolation processing to the memory controller 105, performs interpolation processing after reading out pixels located at those coordinates from the memory 104, and generates an output image.

Next, the method for computing the reference area and the method for determining whether the reference area fits within the captured area (inclusion determination) will be described.

The reference area computing unit 117 respectively computes the reference area required for each geometric deformation of the image, from the output of the sequential coordinate computing unit 111 that is input via the output selection unit 116.

Figure 4:
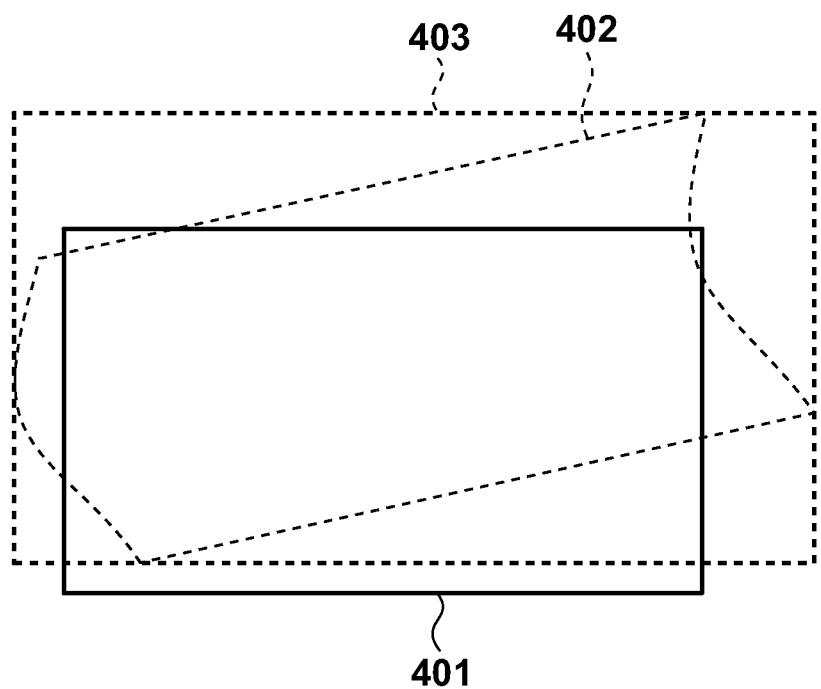
FIG. 4 is a diagram for describing a method of computing a reference area in an embodiment of the present invention.

As shown in FIG. 4, a reference area is obtained such as an area 402, by computing the reference coordinates of coordinates on each side of an output image area 401. In the present embodiment, however, in order to simplify the calculation, a square area 403 that circumscribes the area 402 is treated as the reference area in the following processing.

The reference area computing unit 117 computes the coordinates of the four corners of the square area 403, by computing maximum and minimum values in the X and Y directions of a reference coordinates group that forms the area 402.

Here, the reference area computing unit 117 outputs the coordinate values of the four corners of the four reference areas to the area determining unit 118, with the reference areas obtained from the output of the first to fourth coordinate computing units 112 to 115 as first to fourth reference areas.

The area determining unit 118 computes the displacement amount of each reference area, from the output of the reference area computing unit 117, and performs inclusion determination as to whether the reference area fits within the captured area. The displacement amount is computed with respect to the direction in which the final reference area, that is, the fourth reference area, is most likely to stick out from the captured area.

Here, the displacement amounts of the first to fourth reference areas (i.e., the displacement amount before and after geometric deformation) relative to the output image area are respectively given as first to fourth displacement amounts. The displacement amounts each have a horizontal component and a vertical component, and are thus represented by their separate horizontal and vertical components, such that the first displacement amount is given by Srx, Sry, the second displacement amount is given by Shx, Shy, the third displacement amount is given by Swx, Swy, and the fourth displacement amount is given by Sdx, Sdy.

The method of computing the displacement amount of each reference area will be described using FIGS. 5A to 5D. In FIG. 5A, reference numeral 501 denotes the captured area, reference numeral 502 denotes the output image area, reference numeral 503 denotes the first reference area, and reference numeral 504 denotes the fourth reference area.

First, the area determining unit 118 determines in which of the top right, lower right, top left, and bottom left directions the fourth reference area 504 is most likely to stick out from the captured area 501.

The area determining unit 118 performs this determination based on the sign relationship of the differences between the respective components of the centroid (Xdg, Ydg) of the fourth reference area 504 and the centroid (Xg, Yg) of the captured area 501. That is, a difference dx (=Xdg−Xg) of the horizontal component and a difference dy (=Ydg−Yg) of the vertical component are calculated, and it can then be determined that the fourth reference area 504 is most likely to stick out on the right if dx>0, on the left if dx<0, from the top if dy>0, and from the bottom if dy<0.

In the example of FIG. 5A, since dx>0 and dy>0, the area determining unit 118 determines that the fourth reference area 504 is most likely to stick out from the top right of the captured area 501.

The area determining unit 118 next computes the first displacement amount Srx, Sry. This can be derived as the difference between the coordinates of the vertex at the top right, which was determined as the direction in which the fourth reference area 504 is most likely to stick out, among the vertices of the first reference area 503 and the output image area 502. In the example of FIG. 5A, the differences between the respective components of the coordinates (Xrrt, Yrrt) of the top right vertex of the first reference area 503 and the coordinates of the top right vertex of the output image area 502 (X0rt, Y0rt) will be Srx=Xrrt−X0rt, and Sy=Yrrt−Y0rt.

Figure 5B:
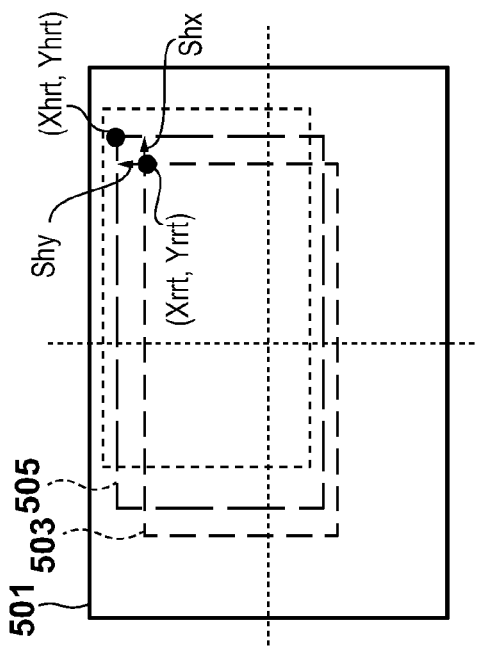
FIGS. 5A to 5D are diagrams for describing a method of determining whether a reference area is encompassed in a captured area in an embodiment of the present invention.

Similarly, as shown in FIG. 5B, the second displacement amount can be computed as Shx=Xhrt−Xrrt and Shy=Yhrt−Yrrt from the coordinates of the top right vertex of a second reference area 505 (Xhrt, Yhrt) and the coordinates of the top right vertex of the first reference area 503 (Xrrt, Yrrt).

Also, the third displacement amount can be computed as the difference between the coordinates of the top right vertex of a third reference area (Xwrt, Ywrt) and the coordinates of the top right vertex of the second reference area (Xhrt, Yhrt), that is, Swx=Xwrt−Xhrt and Swy=Ywrt−Yhrt.

The fourth displacement amount can be computed as the difference between the coordinates of the top right vertex of the fourth reference area (Xdrt, Ydrt) and the coordinates of the top right vertex of the third reference area (Xwrt, Ywrt), that is, Sdx=Xdrt−Xwrt and Sdy=Ydrt−Ywrt.

Note that in the case where the directions in which the fourth reference area 504 are most likely to stick out from the captured area 501 are the bottom right, the top left and the bottom left, the displacement amount for each geometric deformation can be similarly computed by using the coordinates of the bottom right vertex, the coordinates of top left vertex, and the coordinates of the bottom left vertex of the respective areas.

The area determining unit 118 determines whether the reference area fits within the captured area, using the sum total of the displacement amounts thus computed, that is, Sx=Srx+Shx+Swx+Sdx=Xdrt−X0rt, and Sy=Sry+Shy+Swy+Sdy=Ydrt−Y0rt.

Note that, as shown by the above equations, the sum total Sx, Sy of the displacement amounts is equal to the displacement amount of the fourth reference area 504 relative to the output image area 502 in FIG. 5A.

Figure 5D:
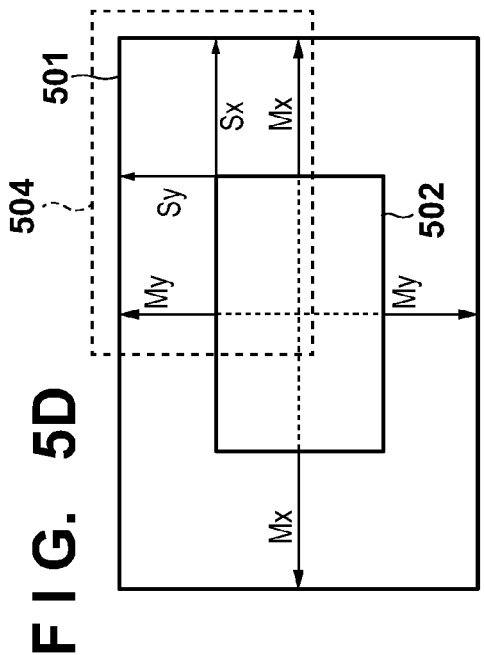
Figure 5A:
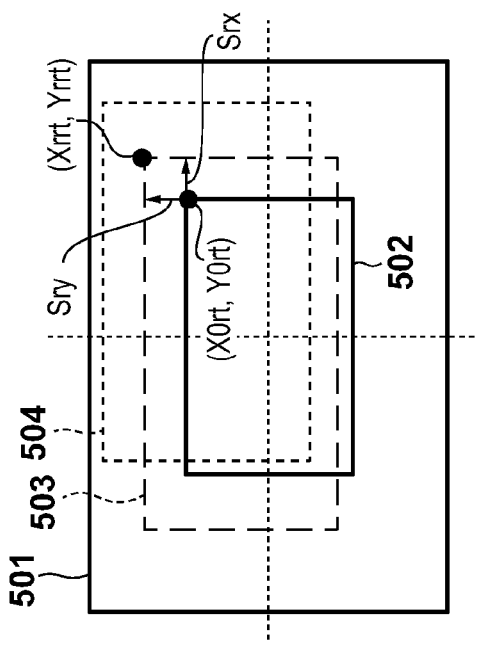
Figure 5C:
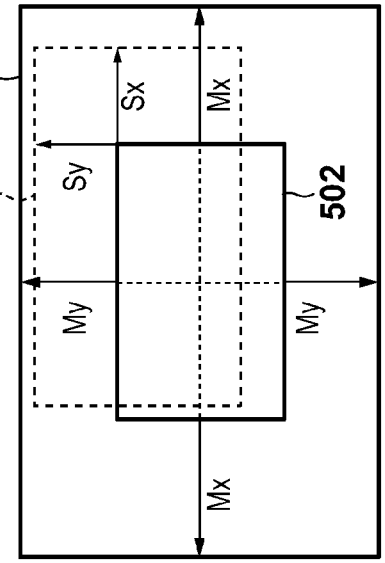

The determination operation by the area determining unit 118 will be further described using FIG. 5C showing the positional relationship of the captured area and the image output area.

Here, Mx is the horizontal width and My is the vertical width of the area ("surplus area") of the captured area 501 excluding the output image area 502. Here, the output image area 502 is set so as to have respectively equal intervals to the captured area 501 in the horizontal direction and the vertical direction.

The area determining unit 118 determines that the reference area 504 fits within the captured area 501 if the conditions Sx≤Mx and Sy≤My are satisfied, and determines that the reference area 504 does not fit within the captured area 501 if these conditions are not satisfied.

In the example of FIG. 5C, because Sx<Mx and Sy<My, the area determining unit 118 determines that the reference area 504 fits within the captured area 501. On the other hand, in the example of FIG. 5D, since Sx>Mx and Sy>My, the area determining unit 118 determines that the reference area 504 does not fit within (sticks out from) the captured area 501.

The area determining unit 118 outputs the determination result to the output selection unit 116 and the system control unit 107, and outputs the displacement amounts of the reference areas to the system control unit 107.

The system control unit 107 outputs the displacement amounts of the reference areas obtained from the area determining unit 118 to the upper limit setting unit 119, in the case where the area determining unit 118 determines that the reference area does not fit within the captured area. Also, the system control unit 107 outputs the geometric deformation parameters input to the sequential coordinate computing unit 111 immediately before to the parameter adjusting unit 120.

The upper limit setting unit 119 sets the upper limit of the displacement amount of each reference area, such that the area determining unit 118 will be determine that the reference area fits within the captured area, and outputs the set upper limits to the parameter adjusting unit 120.

The method of setting the upper limit will be described using FIG. 5D.

The upper limit of each displacement amount can be respectively set for the horizontal component and the vertical component of the displacement amount. Here, although setting of the upper limit for the horizontal component will be described, the upper limit for the vertical component is also set by a similar method to the horizontal component.

The horizontal components of the first to fourth displacement amounts are respectively expressed as A to D, and the corresponding upper limits are respectively expressed as A' to D'. The sum total of each displacement amount is equivalent to Sx in the aforementioned FIG. 5D (i.e., A+B+C+D=Sx). Given that the horizontal width of the surplus area is Mx, the upper limit of each displacement amount can be set as follows in order to satisfy Sx≤Mx.

$$A'=A-(Sx-Mx)\times(A/Sx)=A\times(Mx/Sx)\ B'=B-(Sx-Mx)\times(B/Sx)=B\times(Mx/Sx)\ C'=C-(Sx-Mx)\times(C/Sx)=C\times(Mx/Sx)\ D'=D-(Sx-Mx)\times(D/Sx)=D\times(Mx/Sx) \quad \text{(Eq. 11)}$$

Since (Sx−Mx), which is included in equation 11, is equivalent to the amount that the reference area sticks out from the captured area, the upper limits are set by dividing the sum total of the amounts by which the reference areas stick out according to the size of the displacement amount of each reference area, and subtracting the resultant values from the respective displacement amounts. Accordingly, the difference between the displacement amount and the upper limit that is set increases as the displacement amount increases.

Since the sum total of the upper limits of the displacement amounts thus set will be A'+B'+C'+D'=Mx, the reference area can be configured to fit within the captured area, even if the displacement amount is at the upper limit for all reference areas.

Incidentally, the displacement amounts A, B, C and D may also take negative values in some cases. In the present embodiment, since each displacement amount is computed such that the direction in which the reference area is determined to be most likely to stick out from the captured area will be positive, the displacement amount takes a negative value in the case where the reference area is displaced in the opposite direction. Cases such as shown in FIGS. 6A to 6C are also conceivable.

In FIGS. 6A to 6C, reference numeral 601 denotes the captured area, reference numeral 602 denotes the output image area, and reference numeral 603 denotes the reference area. A represents image enlargement processing, B represents barrel distortion aberration correction, and C represents correction of vertical contraction due to RS distortion, and since the reference area 603 is displaced towards the center of the captured area 601 in each case, the displacement amount takes a negative value.

As evident from these examples, the negative displacement amount can be said to suppress the sticking out of the reference area from the captured area. Accordingly, setting the upper limit for the negative displacement amount in accordance with equation 11 will have the effect of suppressing the original tendency of the negative displacement amount to suppress the sticking out of the reference area.

This problem will be further described using FIGS. 7A to 7C.

In FIG. 7A, reference numeral 701 denotes the captured area, reference numeral 702 denotes the output image area, and reference numeral 703 denotes the reference area resulting from barrel distortion aberration correction.

FIG. 7B shows an example of a reference area 704 in the case of correcting rotation due to camera shake, in addition to barrel distortion aberration correction. In this example, the shaded area of the reference area 704 is sticking out from the captured area 701. Here, the displacement amounts of the reference area resulting from barrel distortion aberration correction and rotation correction are respectively represented as E and F. As evident from FIG. 7A, since the reference area is displaced in the opposite direction to the direction in which the reference area sticks out (in this case, from the top or the bottom), the displacement amount E takes a negative value. On the other hand, since the reference area is displaced in the direction in which the reference area sticks out, the displacement amount F takes a positive value.

In the case where the upper limit of the displacement amounts E and F are set in accordance with equation 11 such that the areas that stick out are eliminated, the reference area after setting the upper limit will be as shown by reference numeral 705 in FIG. 7C. The deformed shape of the reference area 705 due to distortion aberration has been mitigated compared with the reference area 704, and has become substantially rectangular. This is due to the distortion aberration correction being weakened because of the displacement amount E being set the upper limit.

On the other hand, in the case where rather than setting an upper limit for the negative displacement amount E, an upper limit is set so that amount that sticks out is reduced by the positive displacement amount F, the reference area will be as shown by reference numeral 706. The reference area 706 has a shape that has been sufficiently corrected for distortion aberration compared with the reference area 705, and the rotation angle is also closer to the rotation angle of the reference area 704 (larger than the rotation angle of the reference area 705).

This means that the effect that the negative displacement amount has of suppressing sticking out of the reference area is utilized effectively by not restricting the negative displacement amount E, and barrel distortion aberration correction and correction of image shake in the rotation direction are balanced as much as possible by not reducing the positive displacement amount F as much as possible.

From the above, it is considered desirable not to set an upper limit for the negative displacement amount.

In this case, equation 11 can be modified for application as follows:

$$A' = A - (Sx - Mx) \times (Aeff/Sx\_eff) \quad \text{(Eq. 12)}$$
$$B' = B - (Sx - Mx) \times (Beff/Sx\_eff)$$
$$C' = C - (Sx - Mx) \times (Ceff/Sx\_eff)$$
$$D' = D - (Sx - Mx) \times (Deff/Sx\_eff)$$
$$Aeff = \begin{cases} A & (A \geq 0) \\ 0 & (A < 0) \end{cases} \quad Beff = \begin{cases} B & (B \geq 0) \\ 0 & (B < 0) \end{cases}$$
$$Ceff = \begin{cases} C & (C \geq 0) \\ 0 & (C < 0) \end{cases} \quad Deff = \begin{cases} D & (D \geq 0) \\ 0 & (D < 0) \end{cases}$$
$$Sx\_eff = Aeff + Beff + Ceff + Deff$$

The parameter adjusting unit 120 adjusts the geometric deformation parameter that is input from the system control unit 107, based on the upper limit for the displacement amount of each geometric deformation that is input from the upper limit setting unit 119.

The method of adjusting the first geometric deformation parameter Pr such that the first displacement amount does not exceed the upper limit will be described. As described above, the parameters Pr are the horizontal magnification rx and the vertical magnification ry that are used in resizing, and the horizontal clipping amount c and the vertical clipping amount d that are used in clipping.

From equation 1, the first displacement amount and the relationship of the geometric deformation parameters Pr is as follows:

$$\begin{bmatrix} Xr - X \\ Yr - Y \end{bmatrix} = \begin{bmatrix} (1/rx - 1)(X - Xr0) + c \\ (1/ry - 1)(Y - Yr0) + d \end{bmatrix} \quad \text{(Eq. 13)}$$

The maximum values of Xr−X and Yr−Y on the left side are respectively equivalent to the horizontal component and the vertical component of the first displacement amount. In order to suppress the respective upper limits to Xrlim and Yrlim, the geometric deformation parameters Pr can be set to satisfy the following.

$$\begin{bmatrix} (1/rx - 1)(X - Xr0) + c \\ (1/ry - 1)(Y - Yr0) + d \end{bmatrix} \leq \begin{bmatrix} Xr\lim \\ Yr\lim \end{bmatrix} \quad \text{(Eq. 14)}$$

Here, the coordinates (X, Y) are the vertex coordinates of the output image area in the direction in which the reference area is most likely to stick out.

Incidentally, adjusting the variable magnifications rx and ry means that the image will be reduced or enlarged, and it is anticipated that it would look strange if the image gets bigger and smaller in a moving image.

In view of this, rather than adjusting the variable magnifications rx and ry, the upper limits can be adjusted so as to derive the largest clipping amounts c and d that satisfy equation 14, for example. On the other hand, a configuration can be adopted in which the variable magnifications rx and ry are adjusted for the first time in the case where equation 14 is not satisfied even if clipping amount c=d=0, and the largest values of rx and ry that satisfies equation 14 are derived.

The method of adjusting the second geometric deformation parameter Ph such that the second displacement amount does not exceed the upper limit will be described. As described above, Ph is a 3×3 projective transform matrix.

A projective transform matrix can be broken down for consideration into a translational component, a rotational component, and a tilt component. The displacement amount, shown by equation 2, of the reference area resulting from the projective transform matrix H1 relating to translation and rotation can be derived as follows by applying H1 instead of Ph to equation 6.

$$\begin{bmatrix} Xh1 - Xr \\ Yh1 - Yr \end{bmatrix} = \begin{bmatrix} \cos\theta(Xr - Xh0) - \sin\theta(Yr - Yh0) \\ \sin\theta(Xr - Xh0) + \cos\theta(Yr - Yh0) \end{bmatrix} + \begin{bmatrix} tx \\ ty \end{bmatrix} + \begin{bmatrix} Xh0 \\ Yh0 \end{bmatrix} \quad \text{(Eq. 15)}$$

Here, the coordinates (Xr, Yr) are the vertex coordinates of the first reference area in the direction in which the reference area will most likely stick out, and coordinates (Xh1, Yh1) are reference coordinates for performing the projective transform using the matrix H1.

Similarly, the displacement amount, shown by equation 3, of the reference area resulting from the projective transform matrix H2 relating to tilt can be derived as follows by applying H2 instead of Ph to equation 6.

$$\begin{bmatrix} Xh2 - Xr \\ Yh2 - Yr \end{bmatrix} = \begin{bmatrix} (Xr - Xh0)/\{vx(Xr - Xr0) + vy(Yr - Yr0) + 1\} \\ (Yr - Yh0)/\{vx(Xr - Xr0) + vy(Yr - Yr0) + 1\} \end{bmatrix} + \begin{bmatrix} Xh0 \\ Yh0 \end{bmatrix} \quad \text{(Eq. 16)}$$

Here, the coordinates (Xh2, Yh2) are reference coordinates for performing the projective transform using the matrix H2.

Hereinafter, for simplification, the central coordinates of the projective transform are given as (Xr0, Yr0)=(0, 0). By adding together equation 15 and equation 16, the relationship of the second displacement amount and the geometric deformation parameter Ph can be approximately expressed as follows:

$$\begin{bmatrix} Xh - Xr \\ Yh - Yr \end{bmatrix} \approx \begin{bmatrix} (Xh1 - Xr) + (Xh2 - Xr) \\ (Yh1 - Yr) + (Yh2 - Yr) \end{bmatrix} = \quad \text{(Eq. 17)}$$

$$\begin{bmatrix} tx \\ ty \end{bmatrix} + \begin{bmatrix} (\cos\theta)Xr + (-\sin\theta)Yr \\ (\sin\theta)Xr + (\cos\theta)Yr \end{bmatrix} + \begin{bmatrix} Xr/(vxXr + vyYr + 1) \\ Yr/(vxXr + vyYr + 1) \end{bmatrix}$$

The maximum values of Xh−Xr and Yh−Yr on the left side are equivalent respectively to the horizontal component and the vertical component of the third displacement amount. The first term on the right side is the translational component, the second term is the rotational component, and the third term is the tilt component. The upper limit for the displacement amount of each component can be set by dividing the upper limit of the second displacement amount computed by the upper limit setting unit 119 by the ratio of the components. To suppress the upper limits of the horizontal component and the vertical component of displacement amounts of the translational component, the rotational component and the tilt component respectively to txlim, tylim, θxlim, θylim, Vxlim, and Vylim, the geometric deformation parameters Ph and beyond can be set to satisfy the following:

$$\begin{bmatrix} tx \\ ty \end{bmatrix} \leq \begin{bmatrix} tx\lim \\ ty\lim \end{bmatrix} \quad \text{(Eq. 18)}$$

$$\begin{bmatrix} (\cos\theta)Xr + (-\sin\theta)Yr \\ (\sin\theta)Xr + (\cos\theta)Yr \end{bmatrix} \leq \begin{bmatrix} \theta x\lim \\ \theta y\lim \end{bmatrix} \quad \text{(Eq. 19)}$$

$$\begin{bmatrix} Xr/(vxXr + vyYr + 1) \\ Yr/(vxXr + vyYr + 1) \end{bmatrix} \leq \begin{bmatrix} Vx\lim \\ Vy\lim \end{bmatrix} \quad \text{(Eq. 20)}$$

Here, the coordinates (Xr, Yr) are the vertex coordinates of the first reference area in the direction in which the reference area will most likely stick out.

The method of adjusting the third geometric deformation parameter Pw such that the third displacement amount does not exceed the upper limit will be described. As described above, Pw is the amount of rolling shutter distortion correction in the yaw direction and the pitch direction.

From equation 8, the relationship of the third displacement amount and the geometric deformation parameter Pw is as follows:

$$\begin{bmatrix} Xw - Xh \\ Yw - Yh \end{bmatrix} = -\begin{bmatrix} y' \\ p' \end{bmatrix} \quad \text{(Eq. 21)}$$

The maximum values of Xw−Xh and Yw−Yh on the left side are equivalent respectively to the horizontal component and the vertical component of the third displacement amount. Accordingly, to suppress each upper limit to Xwlim and Ywlim, the maximum values of the geometric deformation parameter y' and p' can be set so as to satisfy the following:

$$\begin{bmatrix} y' \max \\ p' \max \end{bmatrix} = \begin{bmatrix} Xw\lim \\ Yw\lim \end{bmatrix} \quad \text{(Eq. 22)}$$

The method of adjusting the fourth geometric deformation parameter Pd such that the fourth displacement amount does not exceed the upper limit will be described. As described above, Pd is the distortion aberration correction amount.

From equation 10, the relationship of the fourth displacement amount and the geometric deformation parameter Pd is as follows:

$$\begin{bmatrix} Xd - Xw \\ Yd - Yw \end{bmatrix} = \begin{bmatrix} (Pdx - 1) & (Xw - Xd0) \\ (Pdy - 1) & (Yw - Yd0) \end{bmatrix} \quad \text{(Eq. 23)}$$

Pdx, Pdy are respectively the horizontal component and the vertical component of Pd.

The maximum values of Xd−Xw and Yd−Yw on the left side are equivalent respectively to the horizontal component and the vertical component of the fourth displacement amount. To suppress the upper limits thereof to Xdlim and Ydlim, the maximum value of the geometric deformation parameter Pd can be set to satisfy the following:

$$\begin{bmatrix} \text{Pdx\_max} \\ \text{Pdy\_max} \end{bmatrix} = \begin{bmatrix} 1 + Xd \lim/(Xw - Xd0) \\ 1 + Yd \lim/(Yw - Yd0) \end{bmatrix} \quad \text{(Eq. 24)}$$

Here, the coordinates (Xw, Yw) are the vertex coordinates of the third reference area in the direction in which the reference area will most likely stick out.

As mentioned above, the geometric deformation parameter adjusted by the parameter adjusting unit 120 is again output to the sequential coordinate computing unit 111 through the system control unit 107. Reference coordinates that are based on the adjusted geometric deformation parameter are computed by the sequential coordinate computing unit 111, and again input to the reference area determining unit 117 via the output selection unit 116.

This is because even though the upper limits are set independently for the displacement amounts of the reference areas obtained as a result of the geometric deformation parameters Pr, Ph, Pw and Pd, the displacement amounts are interdependent given the structure of the sequential coordinate computing unit 111. In other words, if the geometric deformation parameter Pr is adjusted, the displacement amount of the reference area obtained as a result of Ph changes, and the displacement amounts of the reference areas obtained as a result of the other geometric deformation parameters also naturally change. This is also true of the case where the displacement amounts of the reference area resulting from the matrix H1 and the matrix H2 are handled as independent displacement amounts when adjusting the second geometric deformation parameter Ph.

Accordingly, in a structure in which reference areas resulting from a plurality of geometric deformation parameters are calculated sequentially, it is necessary to adjust the geometric deformation parameters and to determine each time whether the reference area fits within the captured area.

Thus, according to the present embodiment, in the case where the reference area used in the geometric deformation processes does not fit in the captured area, in the case of generating an output image by sequentially applying a plurality of geometric deformation processes to the captured image, the upper limits of the displacement amounts of the individual geometric deformation processes are set such that reference area fits. The geometric deformation parameter is then adjusted such that the displacement amount of the geometric deformation processes falls within the range of the upper limit.

Thus, partial loss of the output image due to the deficiency of the captured area can be avoided, when generating an output image by applying a plurality of geometric deformation processes to a captured image.

Second Embodiment

Next, a second embodiment of the present invention will be described. In the first embodiment, in order to fit a reference area within a captured area in each of a plurality of geometric deformation processes that are applied, a method that involves setting an upper limit for the displacement amount according to the displacement amount of the reference area of each geometric deformation processes, and adjusting each geometric deformation parameter so as to satisfy the upper limit was described.

In the present embodiment, the upper limit is set based not only on the displacement amount of the reference area in each geometric deformation processes but also on the priority of geometric deformation processes that depends on the shooting conditions.

Figure 8:
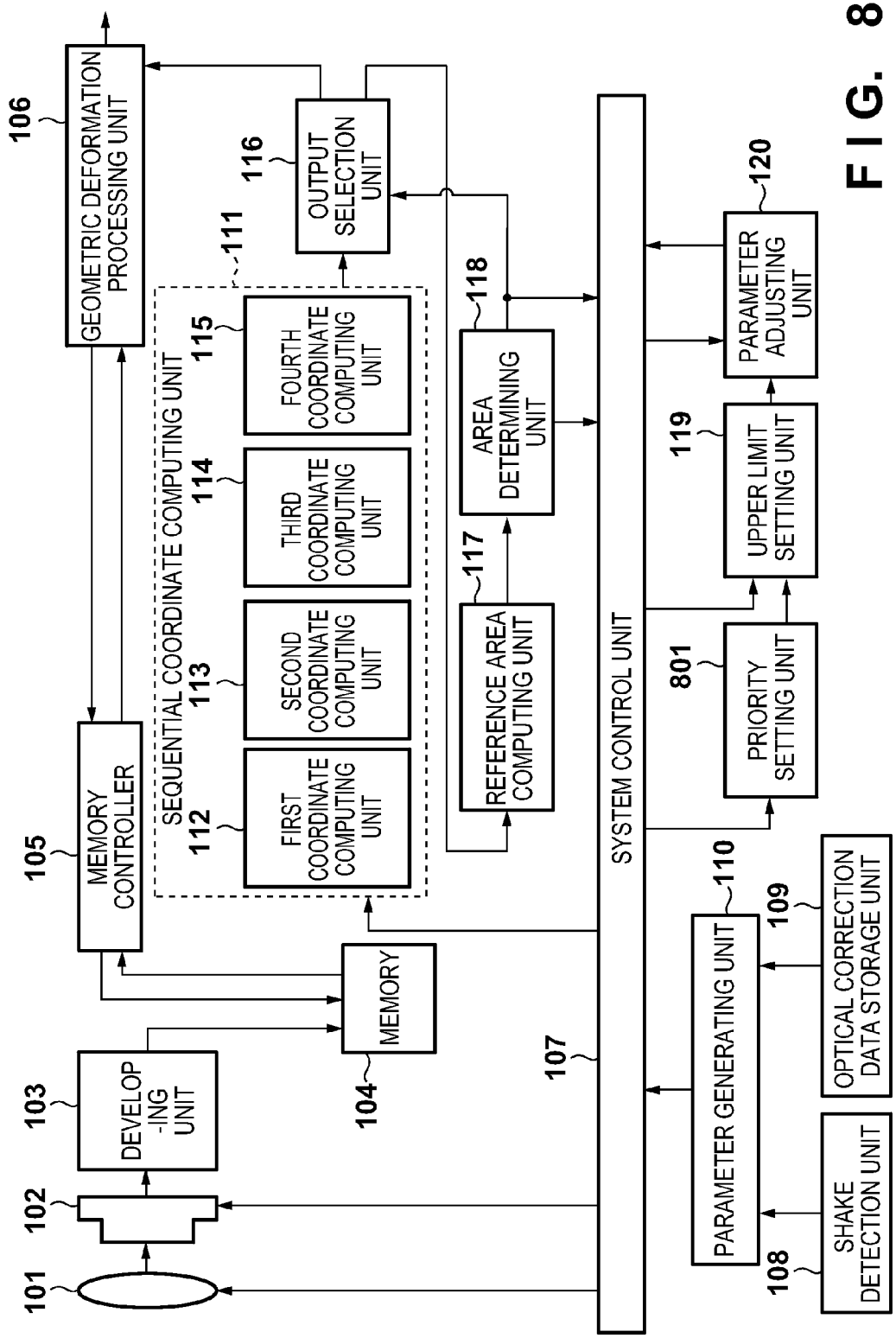
FIG. 8 is a block diagram showing an exemplary functional configuration of a digital camera serving as an example of an image processing apparatus according to a second embodiment of the present invention.

FIG. 8 is a block diagram showing an exemplary functional configuration of a digital camera serving as an example of an image processing apparatus according to the second embodiment of the present invention. Note that, in FIG. 8, the same constituent elements as the first embodiment are given the same referential signs as FIG. 1, and description thereof is omitted.

As is clear from a comparison of FIG. 8 and FIG. 1, the digital camera of the present embodiment is different configurationally from the first embodiment in having a priority setting unit 801. The priority setting unit 801 sets priorities for the plurality of geometric deformation processes that are applied by the sequential coordinate computing unit 111, based on supplementary information that is input from the system control unit 107, and outputs the set priorities to the upper limit setting unit 119. Supplementary information is information such as main subject information, brightness information, shutter speed, and shooting mode, for example, and can be acquired from the image capture unit 103, by analyzing the captured image, or from additional information recorded in the captured image.

The purpose for setting priorities will be described. Providing an upper limit for the displacement amount of a reference area for the reason that the reference area does not fit within the captured area implies that correction is stopped at a level below the required amount, that is, that a correction deficiency occurs. For this reason, priorities are set for the types of geometric deformation processes, in order to reduce the correction deficiency which greatly affects the corrected image, and the deficiency in the correction amount due to setting upper limits is suppressed with regard to types of geometric deformation processes having a high priority.

Note that, in the case of applying a plurality of geometric deformation processes to the same image, the influence exerted on the corrected image after processing by a correction deficiency in each geometric deformation process is thought to differ according to the shooting conditions of the image. In other words, it is thought that a phenomenon occurs whereby the correction deficiency of the first geometric deformation process is noticeable under certain shooting conditions and the correction deficiency of the second geometric deformation process is noticeable under different shooting conditions. In other words, the correction deficiency of which of the plurality of geometric deformation processes to suppress cannot be judged from only the displacement amounts of the reference areas in the respective types of geometric deformation processes. Even if the displacement amounts of the reference areas are the same, the tendency for the correction deficiency to be noticeable can change according to the shooting conditions.

An example of a method of setting the priority of each geometric deformation processes according to supplementary information will be described using FIGS. 9A to 9F. Here, rotation correction and tilt correction that are included in the projective transform, rolling shutter distortion correction and distortion aberration correction are considered as the types of geometric deformation processes.

Also, shutter speed and subject brightness value, which are examples of information indicating the shooting conditions, and main subject information are used as supplementary information. The main subject information is, for example, the likelihood of the main subject being human, the size of the main subject, and the distance to the main subject. The likelihood of the main subject being human and size of the main subject can, in the case of the main subject being a person's face, for example, be obtained by known face detection technology that uses information on the color, contour or the like of the main subject. Also, the distance to the main subject can be obtained from the focusing lens position that is detected by automatic focusing detection processing, for example.

With regard to the likelihood of the main subject being human, it is thought that distortion aberration is more noticeable as the likelihood of being human increases. This is because humans are very good at recognizing people's faces, and thus the viewer will feel that something is strange if a person's face is even slightly distorted. On the other hand, with subjects other than people, such as landscapes, for example, it is thought that motion of the entire screen such as rotation is more noticeable than distortion aberration.

Figures 9D, 9E, 9F:
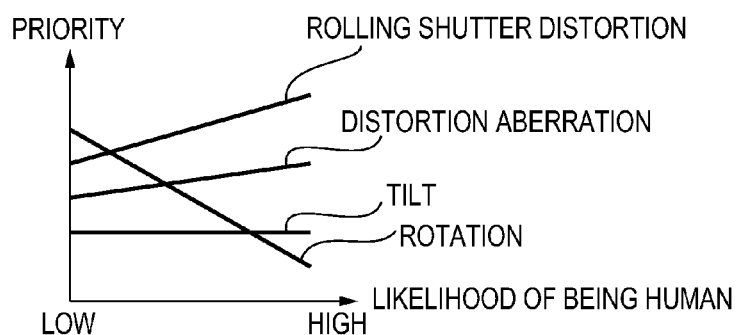
Figure 10A:
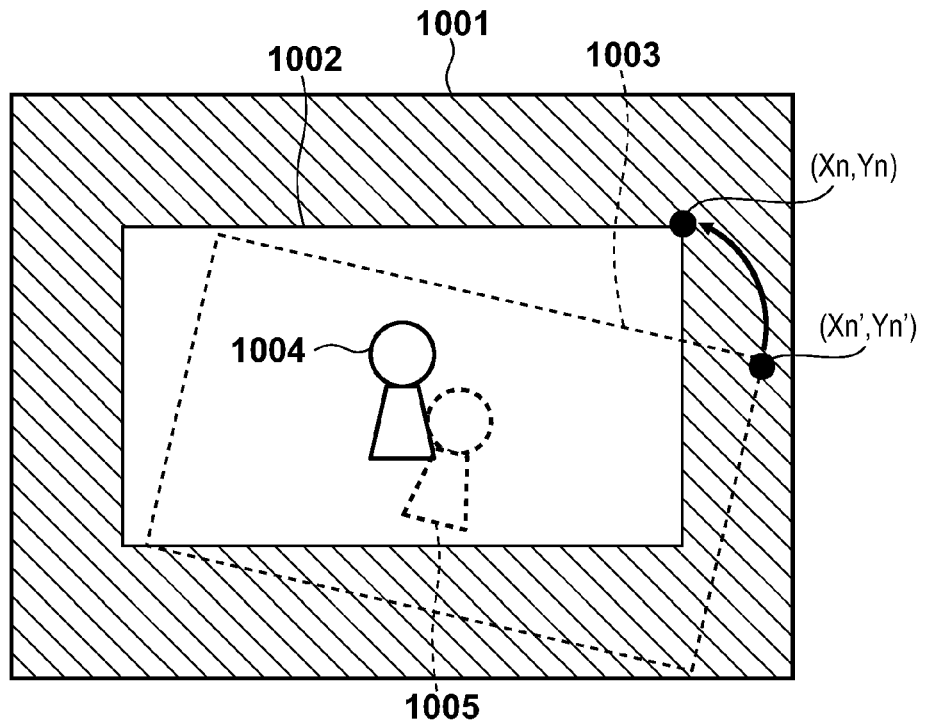
FIGS. 10A and 10B are diagrams for describing geometric deformation of an image.
Figure 10B:
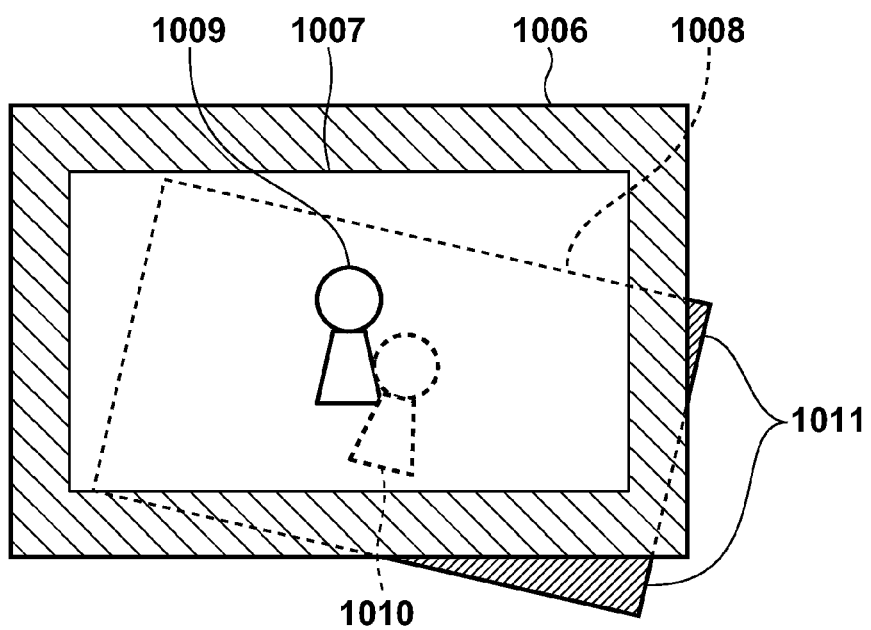

Therefore, as shown in FIG. 9A, it is considered desirable to give priority to geometric deformation processes for correcting rolling shutter distortion, distortion aberration and tilt that produce distortion of an image, and to lower the priority of geometric deformation processes for performing rotation correction, as the likelihood of being human increases. Note that, in FIGS. 9A to 9F and the following description, priorities are described as being given to the types of image quality degradation to be corrected, in consideration of concise description and ease of understanding, but the priorities are, in fact, given to the geometric deformation processes for correcting the image quality degradation that is described.

Note that, in the present embodiment, as shown in FIG. 9A, the highest priority is given to geometric deformation processes that relates to correcting rolling shutter distortion, among the plurality of geometric deformation processes for correcting distortion of an image that is produced by camera shake or the optical characteristics of the image capture lens. This is due to the fact that because rolling shutter distortion is dependent on the type of image sensor and the drive system, and general awareness is low compared with distortion aberration or tilt, it is thought that the viewer is more likely to feel that something is strange. Also, in the case of distortion aberration and tilt, since distortion aberration in which straight lines look curved is considered to be more visually noticeable compared with tilt in which squares look trapezoidal, higher priority is given to geometric deformation processes for correcting distortion aberration.

With regard to the size of the main subject, since it is thought that distortion in the area of the main subject tends to be more noticeable than motion of the entire screen as the size of the main subject increases, priority levels are set such as shown in FIG. 9B, for example.

Similarly, with regard to the distance to the main subject, since it is thought that distortion in the area of the main subject becomes more noticeable than motion of the entire screen as the distance to the main subject decreases, priority levels are set such as shown in FIG. 9C, for example.

With regard to the brightness value, it is thought that in the case where, for example, the average brightness of an image is low, distortion of the image will less noticeable since contrast will be low and the contours of objects will be blurred, and that in the case where the average brightness is high, distortion of the image tends to become more noticeable since the contours can be clearly seen. For this reason, as shown in FIG. 9D, higher priority is given to geometric deformation processes for correcting distortion aberration as the brightness value increases.

With regard to shutter speed, it is thought that motion of the entire image becomes more noticeable than some distortion in the case of a slow shutter speed, since the effect of accumulated shake increases, and that distortion of the image becomes more noticeable than motion of the entire image in the case of a fast shutter speed, since effect of accumulated shake decreases. Accordingly, as shown in FIG. 9E, higher priority is given to geometric deformation processes for correcting distortion as the shutter speed becomes faster.

Also, a specific photographic scene may be detected and a priority that depends on the photographic scene may be set. The photographic scene can be determined by a well-known technique using brightness information and color information. For example, with a scene having many flat parts such as a blue sky or a snowy landscape, since distortion of the image is visually not easily noticeable, priority is given to geometric deformation processes for correcting rotation which is motion of the entire screen. With a twilight scene, which is envisioned to be a scene such as capturing the sun setting over the horizon, it is thought that distortion of the setting sun or sloping of the horizon particularly tends to be noticeable, and thus priority is given to geometric deformation processes that relates to distortion aberration correction and rotation correction. With a night scene, the contours of objects are blurred in dark place as mentioned above, and it is thought that distortion of an image will not be easily noticeable, and thus priority is given to geometric deformation processes for correcting rotation which is motion of the entire image.

Note that while "priority levels" are shown in FIGS. 9A to 9F, since "priority levels" and the "priorities" that are ultimately set for the types of geometric deformation processes are weights, the values actually set can set arbitrarily, except for priorities having the same hierarchical relationship as the priority levels.

For example, in the case where the likelihood of being human is high, the priority of geometric deformation processes for correcting rolling shutter distortion, which has the highest priority level, can be set to "6". In this case, the priorities of the other types of geometric deformation processes will be values less than 6, and can be set such that the priority of geometric deformation processes for correcting distortion aberration, for example, can be set to "4", the priority of geometric deformation processes for correcting tilt is "2", and the priority of geometric deformation processes for correcting rotation is "1".

Also, in the case where the likelihood of being human is low, the priority of geometric deformation processes for correcting rotation can be set to "5", the priority of geometric deformation processes for correcting rolling shutter distortion can be set to "4", the priority of geometric deformation processes for correcting distortion aberration can be set to "3", and the priority of geometric deformation processes for correcting tilt can be set to "2".

In this way, the difference in priorities can be biased or different priorities can be set for types of geometric deformation processes having the same priority level.

While priorities may be changed in a binary manner according to a given threshold, they may also be changed continuously according to the values of supplementary information. For example, exemplary setting of priorities in case the likelihood of being human is given with continuous numerical values is shown in FIG. 9F.

Also, priorities may be decided with reference to priorities set in the past. For example, assuming the priority of each geometric deformation processes in the previous frame were a0, b0, c0, and d0, the priorities in the current frame are set to a1, b1, c1, and d1. In this case, the amounts of change a1−a0, b1−b0, c1−c0 and d1−d0 in the priorities can be set so as to not exceed a predetermined threshold.

Priorities may be set according to instructions from the photographer. For example, the photographer can be prompted to select a geometric deformation process that he or she wants to prioritize through a menu screen or the like, and priorities can be set such that the selected geometric deformation process is given the highest priority.

Here, one priority is determined for each piece of supplementary information, but in the case of obtaining priorities from a plurality of pieces of supplementary information, the priorities of the individual pieces of supplementary information can be added together to obtain the final priority. In the case of adding priorities together, weighted addition may be performed according to the type of supplementary information.

The upper limit setting unit 119 sets an upper limit for the displacement amount of the reference area of each geometric deformation, based on the priority that is input from the priority setting unit 801 and the displacement amount of the reference area of the geometric deformation via the system control unit 107.

For example, a case such as where the priorities of the types of geometric deformation processes for correcting rotation, tilt, rolling shutter distortion, and distortion aberration are a, b, c and d, the displacement amounts of the reference areas are A, B, C, D, and the upper limit of the aggregate displacement amount is M will be described. Here, only the horizontal direction or the vertical direction is considered.

S=A+B+C+D and s=a+b+c+d, and the upper limits of the displacement amounts of the reference areas are expressed as A', B', C' and D'.

As described above, if the upper limits are set based on only the displacement amounts of the reference areas, equation 11 or equation 12 can be used.

As the method of setting upper limits in consideration of priorities, it is conceivable, for example, to generate, for each geometric deformation processes, an evaluation value based on the displacement amount of the reference area and the priority, and to allocate the amount that the reference area sticks out by a rate that is based on the evaluation values.

If the evaluation values of the types of geometric deformation processes are represented as WA, WB, WC and WD, the evaluation values can be calculated as follows, for example.

$$WA=(A/S)\times(1-a/s) \; WB=(B/S)\times(1-b/s) \; WC=(C/S)\times(1-c/s) \; WD=(D/S)\times(1-d/s) \quad \text{(Eq. 25)}$$

The evaluation values indicate the extent to which each geometric deformation process is responsible for the amount that the reference area sticks out, with the implication being that responsibility for the amount that sticks out increases the higher the evaluation value. Accordingly, the evaluation value will be higher the larger the reference area, and the evaluation value will be lower the higher the priority.

The upper limits A', B', C' and D' of the displacement amounts of the reference areas using such evaluation values can be computed by the following equations, having normalized the evaluation values such that the sum thereof is equal to 1, $$W=WA+WB+WC+WD \; WA'=WA/W, \; WB'=WB/W,\\ WC'=WC/W, \; WD'=WD/W \; A'=A-(S-M)\times\\ WA' \; B'=B-(S-M)\times WB' \; C'=C-(S-M)\times WC' \; D'=D-\\(S-M)\times WD' \quad \text{(Eq. 26)}$$

The sum total of the upper limits is M=A'+B'+C'+D'.

Description will be given using specific numerical values. A=40, B=20, C=80, D=40, S=180, M=100, a=6, b=4, c=2, and d=1, such as the previous example. At this time, the evaluation values will be WA=0.11, WB=0.07, WC=0.37, and WD=0.20 from equation 25. The normalized evaluation values are calculated as WA'=0.15, WB'=0.09, WC'=0.49, and WD'=0.27 from equation 26, where W=0.75. Furthermore, A'=28, B'=12, C'=40, and D'=20, giving a total of 100.

It is evident that although the displacement amounts A and D of the reference areas where both equal to 40, A' is set higher than D' since the priorities are a>d. The geometric deformation process for correcting rotation is thereby prioritized over the geometric deformation process for correcting distortion aberration, and rotation correction is adequately performed.

As described above, according to the present embodiment, a correction deficiency can be effectively suppressed as a result of preferentially correcting image quality degradation that is more noticeable, by setting the upper limits of geometric deformation processes in consideration of priorities. Thus, an output image having a visually more desirable image quality can be obtained, while preventing the occurrence of missing areas in the output image.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-281750, filed on Dec. 25, 2012, which is hereby incorporated by reference herein in its entirety.

What is claimed is:

1. An image processing apparatus for correcting image quality degradation, comprising a processor configured to function as:

a generating unit that generates a parameter defining a deformation process for correcting the image quality degradation;

a determining unit that determines whether a reference area, which is an image area required by the deformation process, fits within a captured area that contains the image and is larger than the image;
an adjusting unit that adjusts the parameter such that the reference area fits within the captured area, in a case where it is determined by the determining unit that the reference area does not fit within the captured area; and
a deforming unit that applies the deformation process to the image in accordance with the parameter,
wherein:
the deformation process is a combination of a plurality of geometric deformation processes,
the generating unit generates a plurality of parameters defining the plurality of geometric deformation processes,
the determining unit performs the determination based on a sum total of displacement amounts, in each of the plurality of geometric deformation processes, before and after the geometric deformation process is applied, and a positional relationship of the captured area and the image, and
the adjusting unit adjusts the plurality of parameters that are generated by the generating unit, by setting, for each of the plurality of geometric deformation processes, an upper limit for a displacement amount before and after the geometric deformation process is applied, such that the sum total of displacement amounts is a value in a range in which the reference area fits within the captured area.

2. The image processing apparatus according to claim 1, fur the processor further configured to function as:
a setting unit that sets a priority for each of the plurality of geometric deformation processes, based on at least one of information about a main subject of the image and information indicating a shooting condition,
wherein the adjusting unit sets a higher upper limit for a displacement amount the higher the priority of the corresponding geometric deformation process.

3. The image processing apparatus according to claim 2, wherein the main subject information is any of a likelihood of the main subject being human, a size of the main subject and a distance to the main subject, and the information indicating the shooting condition is a shutter speed and a subject brightness value.

4. The image processing apparatus according to claim 1, wherein the deformation process is one or more of:
resizing and clipping of an image,
a projective transform for correcting tilt and rotation of an image,
rolling shutter distortion correction for correcting rolling shutter distortion produced by shooting with an image sensor that employs a rolling shutter, and
distortion aberration correction for correcting distortion aberration caused by optical characteristics of a lens.

5. An image capture apparatus comprising:
a sensor that detects motion of the image capture apparatus; and
an image processing apparatus for correcting image quality degradation, comprising a processor configured to function as:
a generating unit that generates a parameter defining a deformation process for correcting the image quality degradation;
a determining unit that determines whether a reference area, which is an image area required by the deformation process, fits within a captured area that contains the image and is larger than the image;
an adjusting unit that adjusts the parameter such that the reference area fits within the captured area, in a case where it is determined by the determining unit that the reference area does not fit within the captured area and
a deforming unit that applies the deformation process to the image in accordance with the parameter,
wherein:
the deformation process is a combination of a plurality of geometric deformation processes,
the generating unit generates a plurality of parameters defining the plurality of geometric deformation processes,
the determining unit performs the determination based on a sum total of displacement amounts, in each of the plurality of geometric deformation processes, before and after the geometric deformation process is applied, and a positional relationship of the captured area and the image, and
the adjusting unit adjusts the plurality of parameters that are generated by the generating unit, by setting, for each of the plurality of geometric deformation processes, an upper limit for a displacement amount before and after the geometric deformation process is applied, such that the sum total of displacement amounts is a value in a range in which the reference area fits within the captured area,
wherein the image processing apparatus corrects image quality degradation that has occurred in an image due to motion of the image capture apparatus and outputs the corrected image.

6. A method for controlling an image processing apparatus that corrects image quality degradation, comprising a processor configured to perform:
a generating step of generating a parameter defining a deformation process for correcting the image quality degradation;
a determining step of determining whether a reference area, which is an image area required by the deformation process, fits within a captured area that contains the image and is larger than the image;
an adjusting step of adjusting the parameter such that the reference area fits within the captured area, in a case where it is determined in the determining step that the reference area does not fit within the captured area; and
a deforming step of applying the deformation process to the image in accordance with the parameter,
wherein:
the deformation process is a combination of a plurality of geometric deformation processes,
in the generating step, a plurality of parameters defining the plurality of geometric deformation processes are generated,
in the determining step, the determination is performed based on a sum total of displacement amounts, in each of the plurality of geometric deformation processes, before and after the geometric deformation process is applied, and a positional relationship of the captured area and the image, and
in the adjusting step, the plurality of parameters that are generated in the generating step are adjusted by setting, for each of the plurality of geometric deformation processes, an upper limit for a displacement amount before and after the geometric deformation process is applied, such that the sum total of displacement amounts is a value in a range in which the reference area fits within the captured area.

7. A non-transitory computer-readable recording medium storing a program for causing a computer to function as an image processing apparatus for correcting image quality degradation, comprising:
- a generating unit that generates a parameter defining a deformation process for correcting the image quality degradation;
- a determining unit that determines whether a reference area, which is an image area required by the deformation process, fits within a captured area that contains the image and is larger than the image;
- an adjusting unit that adjusts the parameter such that the reference area fits within the captured area, in a case where it is determined by the determining unit that the reference area does not fit within the captured area; and
- a deforming unit that applies the deformation process to the image in accordance with the parameter, wherein:
the deformation process is a combination of a plurality of geometric deformation processes,
the generating unit generates a plurality of parameters defining the plurality of geometric deformation processes,
the determining unit performs the determination based on a sum total of displacement amounts, in each of the plurality of geometric deformation processes, before and after the geometric deformation process is applied, and a positional relationship of the captured area and the image, and
the adjusting unit adjusts the plurality of parameters that are generated by the generating unit, by setting, for each of the plurality of geometric deformation processes, an upper limit for a displacement amount before and after the geometric deformation process is applied, such that the sum total of displacement amounts is a value in a range in which the reference area fits within the captured area.

* * * * *